Dec. 19, 1922.
R. LaFRANCE.
MEANS FOR FEEDING CHARGES OF MOLTEN GLASS.
FILED AUG. 11, 1920.
1,439,369
2 SHEETS-SHEET 1
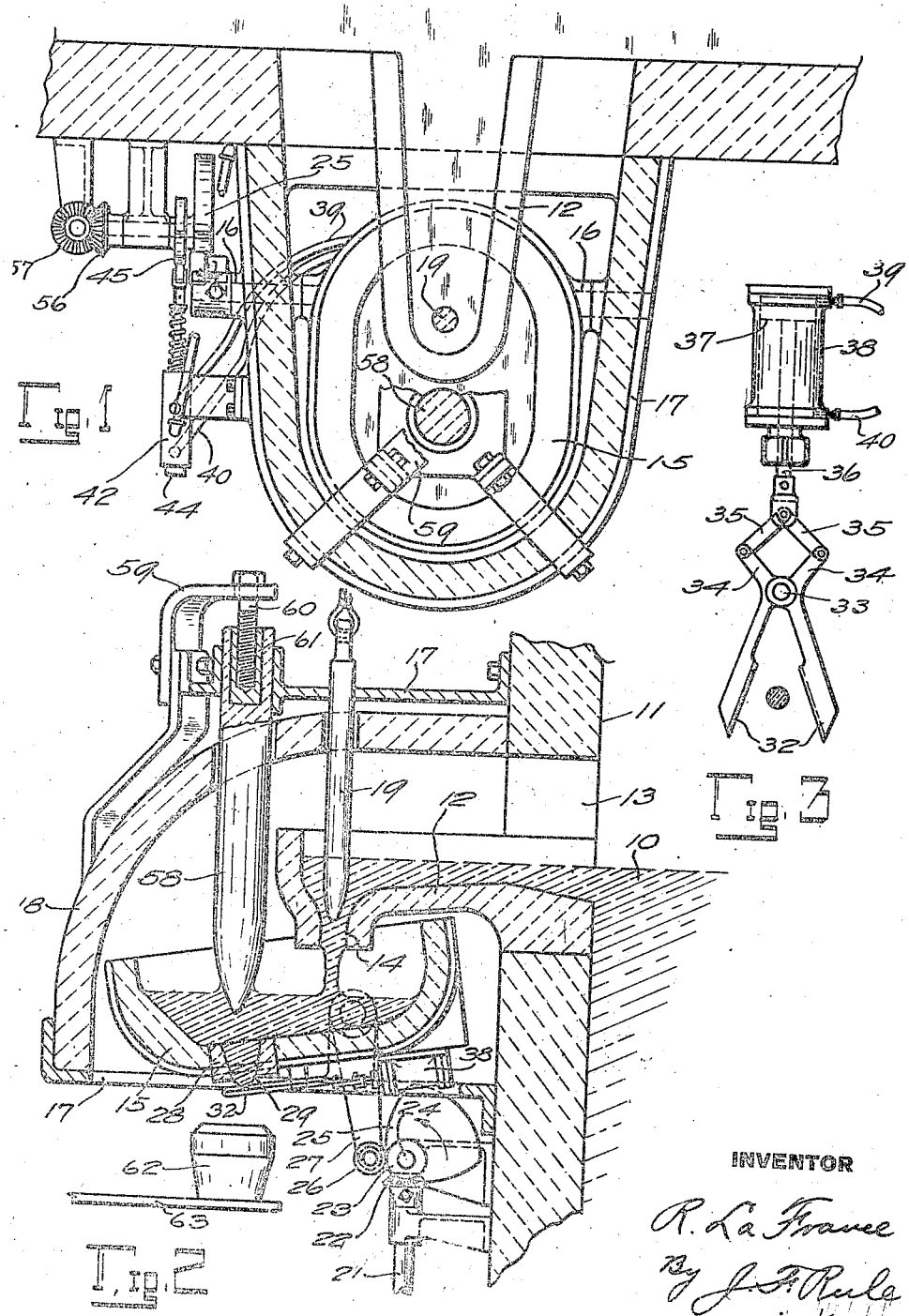
INVENTOR
R. LaFrance
By J. F. Rule
His attorney Dec. 19, 1922.

R. LaFRANCE.
MEANS FOR FEEDING CHARGES OF MOLTEN GLASS.
FILED AUG. 11, 1920.

INVENTOR
R. LaFrance,
By J.F. Rule,
His attorney.

Patented Dec. 19, 1922.

1,439,369

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

MEANS FOR FEEDING CHARGES OF MOLTEN GLASS.

Application filed August 11, 1920. Serial No. 402,816.

*To all whom it may concern:*

Be it known that I, RICHARD LA FRANCE, a citizen of the United States, residing at Toledo, in the county of Lucas and State of Ohio, have invented new and useful Improvements in Means for Feeding Charges of Molten Glass, of which the following is a specification.

The present invention relates to what is known in the art as glass feeders and comprises an improved form of apparatus and method for transferring molten glass from a tank, segregating it into individual masses or gobs and delivering them to molds or other receptacles.

The invention in its preferred form comprises means for flowing the glass continuously from the main tank into a basin or receptacle having a discharge opening in the bottom thereof. This basin is mounted to rock about a horizontal axis, so that the glass therein surges or flows back and forth, whereby the head of glass over the discharge outlet is periodically increased and decreased. This causes a corresponding fluctuation in the flow of glass through the discharge outlet, so that the glass is delivered in masses or gobs which are automatically severed by a cutter located beneath the outlet. The invention further comprises a regulator which may consist of a stationary plug or rod projecting vertically downward into the glass directly over the outlet. This regulator assists in forcing the glass through the outlet as the latter moves upward, and also assists in retarding or interrupting the discharge as the said outlet moves downward, owing to the glass adhering to the regulator.

Other features and advantages of the invention will appear hereinafter.

The present application discloses certain features of novelty also shown in my copending applications, Serial Numbers 402,814 and 402,815, filed August 11, 1920.

In the accompanying drawings:

Figure 1 is a sectional plan view of an apparatus embodying the principles of my invention.

Figure 2 is a sectional side elevation of the same.

Figure 3 is a plan view of the cutter mechanism.

Figure 4:
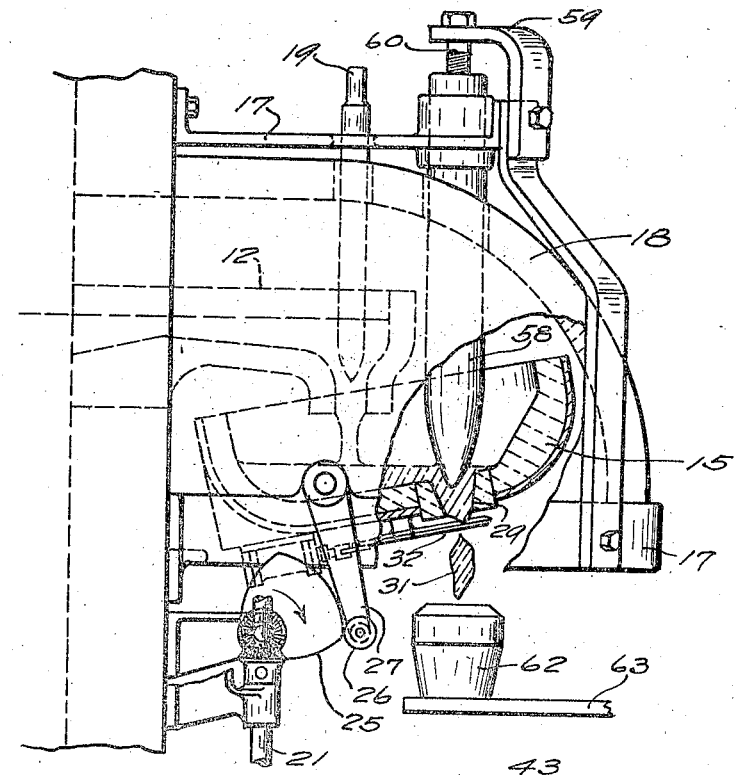
Figure 4 is a part sectional side elevation of the apparatus as viewed in the opposite direction from that of Figure 3, and also showing the moving parts in a different position.

The glass 10 may flow in a continuous stream from a melting furnace or tank 11 through a spout 12 set in an opening 13 in the side wall of the furnace. The outer end of the spout is provided with a discharge opening 14 in the bottom thereof through which the glass flows into a basin or receptacle 15. The basin is mounted to rock about a horizontal axis and for this purpose is provided with trunnions 16 journalled in bearings in a metal framework 17. Said framework also provides a support for a clay boot or covering 18 which surrounds and encloses the trough 12 and basin 15. The rate at which the glass flows into the basin may be regulated and controlled by a clay plug 19 adjustable vertically over the outlet 14 and which, if desired, may be lowered to close said outlet and thereby stop the flow when the apparatus is not in use.

A continuously rotating vertical drive shaft 21 has a driving connection through bevel gears 22 and 23 to a horizontal cam shaft 24 on which is a cam 25 on which runs a cam roll 26 carried on an arm 27 keyed to one of the trunnions 16. The cam is given one complete rotation for each rotation of the drive shaft 21, and the basin 15 is thereby rocked. A bushing 28 in the bottom of the basin, preferably near the outer end thereof, is provided with a discharge orifice 29 through which the glass issues. As the basin rocks, the glass therein flows back and forth from one end to the other thereof in the form of a surge or wave. The head of glass over the outlet 29 is thereby alternately increased and diminished periodically. As the head of glass increases, the rate at which it flows or is discharged by gravity through the outlet increases, causing the glass to be extruded in a mass or gob 31 depending from said orifice. As the glass recedes, the rate of flow is diminished and the flow of glass away from the orifice exerts more or less of an upward pull on the glass at the orifice, owing to the viscous nature of the glass, so that the flow is retarded or momentarily interrupted. At this moment the gob is severed by a pair of shears 32 which are mounted on the bottom of the basin, and cut the glass at the reduced neck formed when the flow is interrupted.

Figure 5:
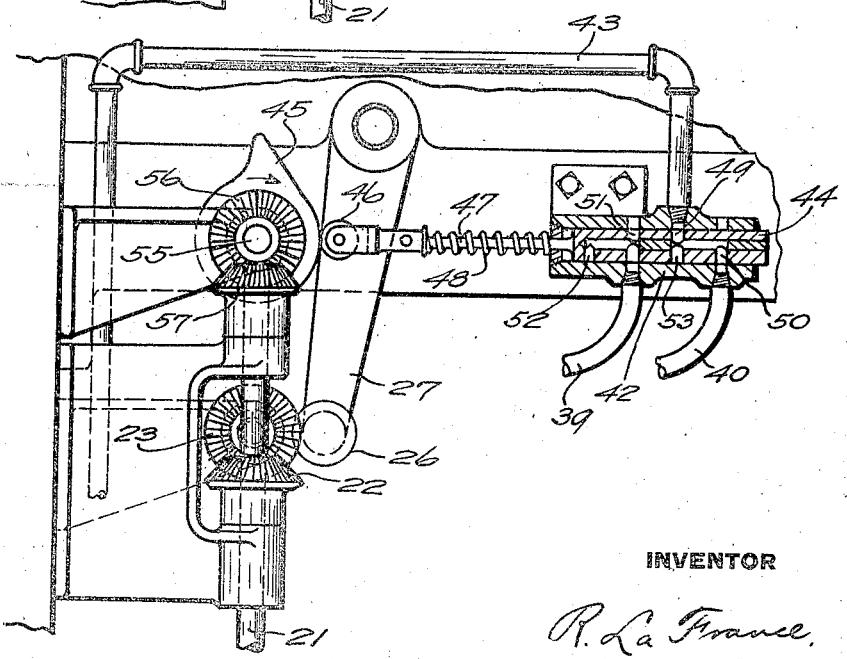
Figure 5 is a part sectional elevation on an enlarged scale showing the valve mechanism controlling the cutter motor.

The shears 32 are mounted on a pivot 33 and are provided with shanks 34 to which are connected a pair of toggle links 35 pivoted to a piston rod 36 of a piston 37 working in an air cylinder 38. When air under pressure is supplied through a pipe 39 behind the piston, the movement of the piston first straightens the toggle, thereby bringing the shear blades together, and as the toggles pass the straight line position the blades are again separated. When air pressure is admitted through the pipe 40 in front of the piston, this movement is reversed. Thus, each stroke of the piston causes a quick closing and opening of the shears. The air supply to the motor is controlled by a valve 42 (see Fig. 5) which is connected through a pipe 43 to a constant source of air pressure. This valve comprises a reciprocating valve member or core 44 actuated by a cam 45 on which runs a cam roll 46 carried by the stem 47 of the valve. A spring 48 holds the roll 46 against its cam. With the valve in the position shown, air passes from the pipe 43 through ports 49 and 50 to the pipe 40. At the same time the pipe 39 exhausts through a port 51. When the valve is moved to the right the pressure is supplied through ports 51 and 52 to the pipe 39, while the pipe 40 exhausts through a port 53. The cam 45 is mounted on a shaft 55 which is driven from the shaft 21 through gears 56 and 57.

The flow of glass through the outlet 29 may be further regulated and controlled by a regulator 58 which, as shown, is in the form of a vertical clay plug or plunger projecting downward into the glass in the basin. This regulator is supported from a bracket 59 on the frame 17, being connected to said bracket by an adjusting screw 60 having a threaded connection with a metal plug 61 in the upper end of the regulator. This construction permits the regulator to be adjusted up and down. The regulator is arranged directly over the outlet 29 so that as the latter moves upward, there is a relative downward movement of the regulator which exerts an expelling force on the glass, thereby assisting in forcing the glass rapidly outward in a mass or gob. As the outer end of the basin swings downward there is a relative upward pull on the glass at the outlet 29, owing to the tenacity of the glass and its adherence to the plug, so that the flow is retarded or temporarily stopped, and under certain conditions may be drawn upward within the bushing 28. The shears are timed to operate after a gob has been expelled and preferably just after the upward pull of the glass commences.

Molds 62 are mounted on a mold table 63 which may form part of the rotating carriage of a glass forming machine. The drive shaft 21 may be driven from said machine or in synchronism therewith, the parts being so timed that a mold 62 is brought into charge receiving position beneath the outlet 29 each time the shears operate to sever a gob.

Variations may be resorted to within the spirit and scope of my invention.

What I claim is:

1. The combination of a receptacle to contain molten glass, said receptacle provided with an outlet orifice continuously below the surface of the glass, and automatic means to rock said receptacle and cause a periodic raising and lowering of said orifice.

2. The combination of a receptacle to contain molten glass, said receptacle provided with an outlet orifice, automatic means to rock said receptacle and cause a periodic raising and lowering of said orifice, and means for periodically severing the glass discharged through said orifice.

3. The combination of a receptacle to contain molten glass, having a discharge orifice in the bottom thereof, and means to rock said receptacle about a horizontal axis and thereby periodically raise and lower said orifice.

4. The combination of a basin to contain molten glass, and means to rock said basin in a manner to cause the glass to surge from one end to the other thereof, said basin having a discharge orifice continuously below the normal level of the glass therein.

5. The combination of a basin to contain molten glass, means to rock said basin in a manner to cause the glass to surge from one end to the other thereof, said basin having a discharge orifice continuously below the normal level of the glass therein, and means to continuously supply molten glass to said basin.

6. The combination of a tank to contain molten glass, a receptacle located outside the tank, means to continuously flow glass from the tank into the receptacle, the latter having a continuously open discharge orifice in the bottom thereof, and automatic means to periodically rock said receptacle about a horizontal axis.

7. The combination of a tank to contain molten glass, a receptacle located outside the tank, means to continuously flow glass from the tank into the receptacle, automatic means to periodically rock said receptacle about a horizontal axis, said receptacle having a discharge orifice, and means cooperating therewith to cause a fluctuating discharge of the glass in synchronism with the rocking movements of the receptacle.

8. The combination of a receptacle having an outlet opening in the bottom thereof, means to rock said receptacle and thereby cause an up and down movement of said opening, and a regulator in the glass over said opening operable by the relative movement of said opening to control the discharge of glass.

9. The combination of a receptacle to contain molten glass, having a discharge opening in the bottom thereof, means to rock the receptacle and thereby move said opening up and down, and a regulator projecting downward into the glass above said opening.

10. The combination of a receptacle to contain molten glass, having a discharge opening in the bottom thereof, means to rock the receptacle and thereby move said opening up and down, and a stationary regulator projecting downward into the glass above said opening and operable by the relative movement of the receptacle and regulator to exert an alternate expelling and retarding force on the glass at said opening.

Signed at Toledo, in the county of Lucas and State of Ohio, this 9th day of August, 1920.

RICHARD LA FRANCE.